ial Number: 834,103

United States Patent [19]
Miyagawa et al.

[11] Patent Number: 4,696,452
[45] Date of Patent: Sep. 29, 1987

[54] TRIP THROTTLE VALVE

[75] Inventors: Teiji Miyagawa; Yoshio Iwamura; Masao Hayakawa, all of Kanagawa, Japan

[73] Assignee: Ebara Corporation, Tokyo, Japan

[21] Appl. No.: 834,103

[22] Filed: Feb. 24, 1986

Related U.S. Application Data

[63] Continuation of Ser. No. 573,378, Jan. 24, 1984, abandoned.

[30] Foreign Application Priority Data

Jan. 28, 1983 [JP] Japan ............................ 58-9970[U]
Jan. 28, 1983 [JP] Japan ............................ 58-9971[U]
Jan. 28, 1983 [JP] Japan ............................ 58-9972[U]

[51] Int. Cl.⁴ ............................................. F16K 31/143
[52] U.S. Cl. ........................... 251/25; 91/391 R; 251/14
[58] Field of Search ............ 251/14, 25, 48, 58, 251/66, 74; 137/624.18; 624.19, 637; 91/391 R; 74/424.8 VA

[56] References Cited

U.S. PATENT DOCUMENTS

| | | | |
|---|---|---|---|
| 2,644,485 | 7/1953 | Schvendner | 251/14 |
| 2,759,455 | 8/1956 | Kind | 251/25 |
| 2,869,584 | 1/1959 | Gordon | 251/25 |
| 2,885,172 | 5/1959 | Natlo | 251/74 |
| 2,908,477 | 10/1959 | Buri | 251/14 |
| 3,029,060 | 4/1962 | Anderson | 251/14 |
| 3,402,912 | 8/1968 | Watkins | 251/14 |
| 3,556,463 | 1/1971 | Williams | 251/14 |
| 3,778,027 | 12/1973 | Collins et al. | 251/74 |
| 3,896,840 | 7/1975 | Anderson | 251/25 |
| 4,217,814 | 8/1980 | Wood, Jr. | 251/14 |
| 4,230,299 | 10/1980 | Pierce, Jr. | 251/14 |
| 4,351,353 | 9/1982 | Filidoro et al. | 251/14 |
| 4,423,624 | 1/1984 | Kuboichi | 251/74 |

FOREIGN PATENT DOCUMENTS

| | | | |
|---|---|---|---|
| 999824 | 7/1965 | United Kingdom | 251/14 |
| 1436749 | 5/1976 | United Kingdom | 251/14 |

Primary Examiner—Samuel Scott
Assistant Examiner—H. A. Odar
Attorney, Agent, or Firm—Oblon, Fisher, Spivak, McClelland & Maier

[57] ABSTRACT

A trip throttle valve with a manual exerciser and combination of a hydraulic piston and a biasing force bearing sleeve is provided in place of a piston. The piston is not directly connected to a valve stem and the sleeve is threadably engaged with the valve stem so as to cause relative axial movement between the sleeve and the valve stem when the stem is rotated through the manual exerciser. The hydraulic portion of the valve is provided with a by-pass passage so that the piston is made axially movable toward the sleeve under the pressure which occurs when the by-pass passage for the hydraulic liquid is blocked but the piston is arrested at a certain axial position where the by-pass passage is still blocked and the axial movement of the sleeve is restricted against the piston. Blocking of the by-pass passage is arranged to take place after the axial separating distance between the sleeve and the piston reaches a predetermined value so that any inadvertent movement of the valve stem by the engagement of the piston with the sleeve is avoided.

4 Claims, 8 Drawing Figures

TRIP THROTTLE VALVE

This application is a continuation of application Ser. No. 573,378, filed Jan. 24, 1984, now abandoned.

FIELD OF THE INVENTION

This invention relates to a trip throttle valve generally disposed upstream of a steam passage for a steam turbine or the like and, more particularly, to a valve operated with a hydraulic and manual exerciser which is instantly shut off by the operation of the hydraulic circuit in case of emergency.

BACKGROUND OF THE INVENTION

There have been available several kinds of trip throttle valves (so-called T and T valves). Among them, a hydraulically controlled type has also been known. In such a T and T valve with hydraulic manual exerciser, the opened state thereof is maintained by a hydraulic pressure and, in case of emergency, the valve is momentarily closed by releasing the hydraulic pressure. After such emergency shut off, such valve is to be reset for further operation. In addition, a valve body is moved manually, after the resetting, to open the valve and the valve body is maintained in its opened state by application of the hydraulic pressure to a piston within a hydraulic cylinder, the piston being connected to the valve body and normally being urged by a spring in such a direction as to close the valve. In this type of valve, if the sequence of operation is not in a proper order, the piston may cause sudden opening or rapid opening of the valve in opposition to the opening mode intended by the operator thereby creating a dangerous situation.

Therefore, it has been desired to provide an emergency trip throttle valve which avoids the possibility of an unexpected and dangerous operating situation being caused.

SUMMARY OF THE INVENTION

Accordingly, it is an object of the present invention to provide a trip and throttle valve which is free from the drawbacks of the prior art mentioned above.

It is also an object of the present invention to provide a trip throttle valve which is easy to handle.

It is a further object of the present invention to provide a trip throttle valve having a simplified construction.

The above objects are accomplished by the present invention.

The trip throttle valve according to the present invention incorporates a hydraulic piston which is not directly coupled to a valve stem and the valve body is attached to one end of the valve stem and a sleeve having a flange is threadably engaged with the valve stem at the opposite end portion of the stem. The piston is disposed around the valve stem so as to be axially movable toward the sleeve when the hydraulic pressure is applied to the piston but arrested at a certain axial position whereat the sleeve may be kept stationary after the sleeve is moved by the rotation of the valve stem to contact the piston positioned in said certain axial position whereby further rotation of the stem will cause axial movement of the valve stem itself. In the trip throttle valve according to the present invention, a by-passing passage is provided in the hydraulic portion of the valve which is arranged to effect application of the hydraulic pressure to the piston after a predetermined axial separation has been achieved between the sleeve and the piston by the rotation of the valve stem.

Further objects and advantages of the present invention will be made clear when the detailed description of the invention is reviewed referring to the accompanying drawings, the brief explanation of which is summarized below before the detailed description.

DETAILED DESCRIPTION OF THE PREFERRED EMBODIMENTS

Before explaining the embodiments according to the present invention, some explanation is given with respect to a trip throttle valve of prior art to facilitate understanding of the present invention.

Figure 1:
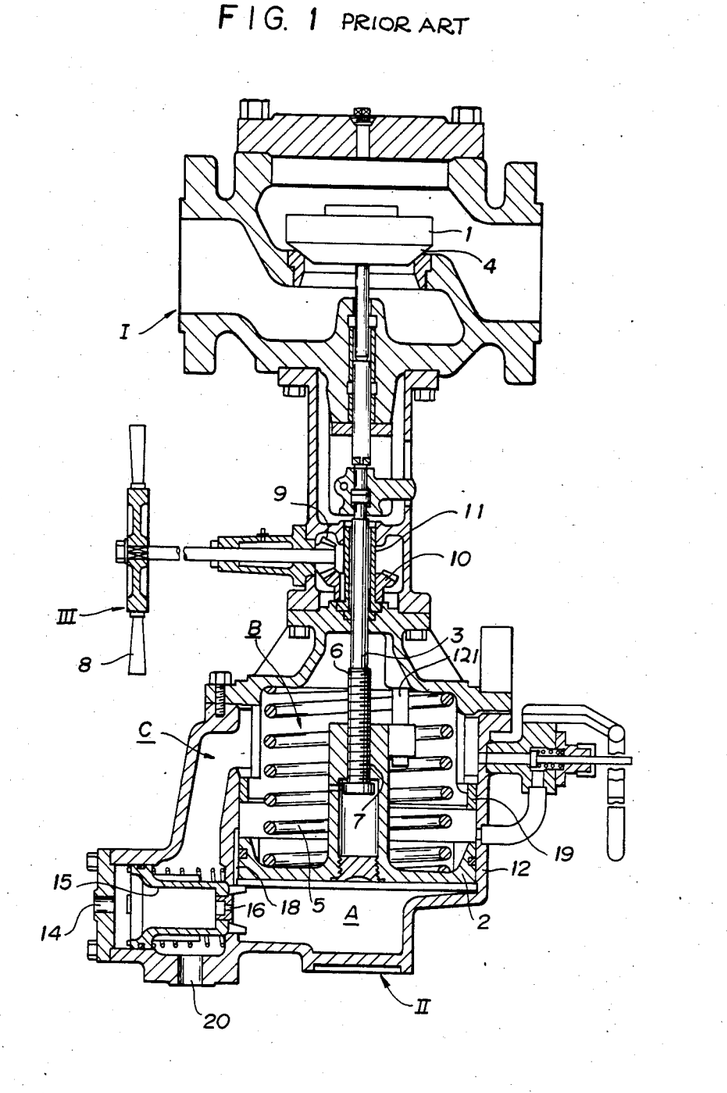
FIG. 1 is a cross sectional view of a trip throttle valve of prior art.

Referring to FIG. 1, there is shown a trip throttle valve using a hydraulic cylinder and a piston for keeping the valve open and rapidly shutting off the fluid passage in case of emergency. The valve comprises three major portions, namely, I: Closure Portion for the main fluid passage;
II: Hydraulic Portion; and
III: Manipulating Portion.

A valve body 1 in the portion I and a piston 2 in the portion II are interconnected by a rod or valve stem 3 extending through the portion III. The valve is shown in FIG. 1 in its closed state wherein the valve body 1 is seated in a valve seat 4 so that the passage of fluid or steam therethrough is blocked. This closed state is maintained by a spring 5 urging the piston 2 downwardly as viewed in FIG. 1. The valve body 1 is securely attached to one end of the valve stem 3 while the piston 2 is attached to the other end of the valve stem 3 by thread engagement with the male thread 6 on the other end of the stem 3 and the female thread 7 at the upper center portion of the piston 2. The valve stem 3 is arranged to be rotated by a manipulating handle 8 through bevel gears 9 and 10. The bevel gear 10 is coupled to the valve stem 3 via a sleeve 11. The stem 3 rotates with the sleeve 11 by a key provided therebetween and the stem 3 is arranged to be slidable through the sleeve 11 in the axial direction thereof. Therefore, when the handle 8 is rotated, the stem 3 rotates so that the piston 2 is axially shifted within a hydraulic cylinder 12 by the rotation of the thread 6 since the piston 2 is generally held in an nonrotatable condition with a guide rod 21. However, under the condition that the axial shifting of the piston 2 is arrested, the stem 3 itself will be axially moved relative to the arrested piston 2 and the sleeve 11 thereby causing the movement of the valve body 1.

The valve stem 3 may be made in two parts interconnected by a suitable coupling so that the upper part may not be rotated by the handle 8 but axially movable together with the lower part of the stem.

Figure 2:
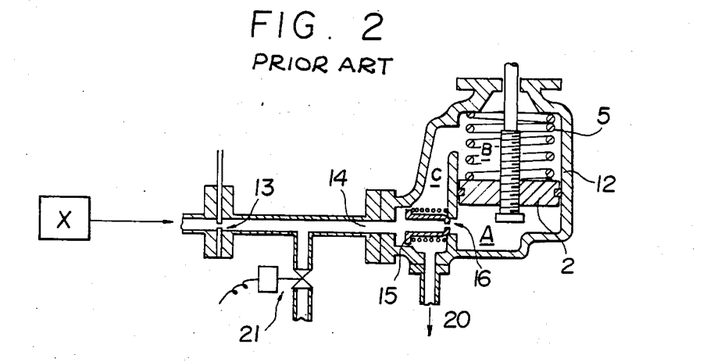
FIG. 2 is a schematic illustration of a hydraulic system used for the trip throttle valve shown in FIG. 1 together with part of the valve, however, the system outside of the valve is also applicable to the present invention.

Regarding the hydraulic system employed with the valve shown in FIG. 1, explanation will be given hereinbelow referring to FIG. 2 as well as FIG. 1.

Figure 3:
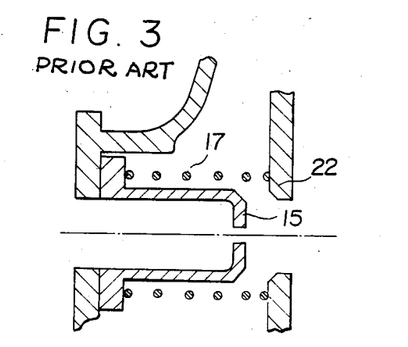
FIG. 3 is a cross section of a relay valve plunger employed in the valve shown in FIG. 1.

An oil chamber A is defined by the cylinder 12 and the piston 2 at the position below the piston 2. To this chamber A, a hydraulic liquid or oil is supplied from a source "X" through a hydraulic system comprising an orifice 13, an inlet port 14 of the cylinder housing and a relay valve comprising a plunger 15. The relay valve plunger 15 is provided with an orifice 16 and the plunger is normally urged by a spring 17 to a position away from the chamber A as shown in FIG. 3. In the portion above the piston 2 within the cylinder 12, an oil chamber B is defined. When the piston 2 is in the position shown in FIG. 1, there is fluid communication between the chambers A and B through a by-passing passage 18 provided on the inner surface of the cylinder 12. However, this communication through the passage 18 is blocked when the piston 2 is reset or lifted by rotation of the valve stem 3. Upward movement of the piston 2 is arrested at a certain axial position by a stopper 19. The oil chamber B is communicated with a discharge chamber C which is also connected to a discharge or outlet port 20 of the cylinder housing. At an upstream position of the inlet port 14 and downstream of the orifice 13, diverged discharge plumbing is provided having a release valve 121 through which oil is discharged when the valve 121 is opened. When no oil is supplied from the source "X", the relay valve 15 is in the position shown in FIG. 3 and the oil is discharged from the cylinder 12 through the outlet port 20 whereby the piston 2 is in the position shown in FIG. 1 under the urging force of the spring 5 and the valve body 1 closes the main passage.

The respective sizes of the orifices and/or passages 13, 14, 16, 18 and 20 are arranged so that the orifice 16 is the smallest (e.g. 2 m/m dia., 3.1 mm$^2$), the orifice 13 is a little larger (e.g. 4 m/m dia., 12.6 mm$^2$) and passage 18 is still larger (e.g. 15 mm$^2$). The opening diameter of the release valve 21 is arranged to be even larger (e.g. 15 m/m dia.). Since the relative sizes of the respective oil passages are arranged in this relationship, when the oil is supplied from the source "X" with the release valve 21 being closed, the relay valve plunger 15 is moved toward a valve seat 22 against the spring 17 to close the oil passage at the valve seat 22 while permitting some passage of oil through the orifice 16 into the oil chamber A. However, if the piston 2 is in the position shown in FIG. 1 wherein the passage 18 is not blocked by the piston 2, pressure will not be accumulated in the chamber A so as to cause the movement of the piston 2 upwardly.

In order to effect opening of the main steam passage in the closure portion I by the valve body 1 and the vlave seat 4, the piston 2 is to be reset to close the by-pass passage 18. The length of the by-pass passage 18 is arranged to be shorter than the stroke of the piston 2. In order to reset the piston 2, the manipulating handle 8 is rotated in a direction to close the main passage in the closure portion I. This rotation rotates the valve stem 3 whereby the piston 2 is moved upwardly by the thread engagement of the male and female threads 6 and 7 to thus close the by-pass passage 18. Thereafter, the oil is supplied from the source "X" whereupon the oil pressure is built up within the oil chamber A to urge the piston 2 firmly against the stopper 19 by overcoming the urging force of the spring 5 whereby the piston 2 is held in a stationary position. Under this condition, if the handle 8 is rotated in the direction to open the main passage, the valve stem 3 is rotated. Because the piston 2 is kept stationary, the stem 3 will move axially upwardly to raise the valve body 1 gradually from the valve seat 4, thus opening the main passage. In case of emergency, the release valve 21 is opened to instantly close the main passage as noted below. If the release valve 121 is opened, due to the arrangement of sizes of the oil passages leading to the oil chamber A, the oil pressure in the relay valve plunger 15 is quickly released, which allows the spring 17 to cause the plunger 15 to move away from the seat 22. Consequently, the oil is quickly discharged from the chamber A through the large opening of the seat 22 and the outlet port 20 whereby the spring 5 rapidly moves the piston downwardly.

However, if the supply of oil pressure to the chamber A is commenced before resetting of the piston 2 and thereafter the handle 8 is rotated in the closing direction of the main passage, the piston 2 will move upwardly so as to close the by-pass passage 18, whereupon the hydraulic pressure may suddenly act on the piston 2 raising it together with the stem 3 and the valve body 1 so as to rapidly open the main passage in opposition to the resetting mode intended by the operator which thereby causes a critical condition. If the manual rotation of the handle is carried out quickly in order to reset the piston faster than the speed at which the piston would be actuated by oil under such condition, the critical movement of the valve body might be prevented; however, such operation is impractical.

Figure 4:
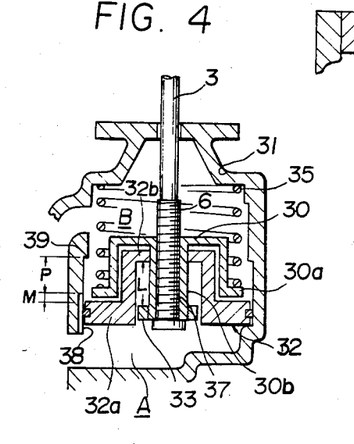
FIG. 4 is a cross sectional view of a hydraulic portion of a trip throttle valve according to the present invention.

An embodiment according to the present invention shown in FIG. 4 overcomes the drawbacks above. It is to be noted that this drawing illustates only a portion of the hydraulic cylinder 31 corresponding to the portion II in FIG. 1. The remaining portions are to be considered to be substantially the same as those in FIGS. 1 and 2 and therefore, for the valve stem in this embodiment, the same reference "3" is applied as in FIG. 1. In this embodiment, a hat sleeve 30 is provided separately from a piston 32 which receives the hydraulic pressure from the chamber A. The hat sleeve 30 is of a hat shape provided with a flange 30a and a sleeve 30b. The sleeve 30 is centrally threaded to provide a female thread 37 which engages the male thread 6 at around the lower end of the stem 3. The piston 32 is also formed to have a hat shape having a flange 32a and a top portion 32b. The periphery of the flange 32a slidingly engages the inner surface of a hydraulic cylinder 31 and the top portion 32b slidingly engages the outer cylindrical surface of the sleeve 30b by means of a central aperture provided at the top portion 32b. At the lower end of the sleeve 30b, a ring member 33 is attached thereto so as to permit the relative motion of the axial distance "L" between the top portion 32b and the ring member 33. The hat sleeve 30 is urged downwardly at its flange 30a by a spring 35 similar to the spring 5 in FIG. 1. Thus, when the hat sleeve 30 is raised by the rotation of the stem 3 by the distance "L" against the spring 35, the member 33 engages the top portion 32b of the piston 32 and further upward movement by the distance "M" of the hat sleeve 30 is arranged to close a by-passing passage 38 provided in the cylinder 31 similar to the passage 18 in FIG. 1. A stopper 39 is provided in the cylinder 31 to limit the stroke of the upward movement of the piston 32 to the dimension "P" after the upward movement of the distance "M".

Regarding the operation of the valve shown in FIG. 4, the stem 3 is rotated by the handle 8 shown in FIG. 1 to raise the hat sleeve 30 by the distance "L" against the spring 35 whereupon the piston 32 is raised by the ring member 33 by the distance "M" so that the by-passing passage 38 is blocked. After blocking of the passage 38 by the piston 32, the hydraulic pressure in the oil chamber A will move the piston 32 upwardly by the distance "P" until it is arrested by the stopper 39 so that the resetting is complete.

Upon completion of the resetting, the rotation of the stem 3 through the handle 8 in the opening direction of the main passage will initially cause the hat sleeve 30 to be lowered until it rests on the piston 32 and further rotation of the stem 3 will cause upward axial movement of the stem 3 with the valve body 1 to gradually open the main passage since the hat sleeve 30 is kept stationary due to being prevented from further movement by the hydraulic pressure of the chamber A acting on the piston 32. In this case, quick shut off of the main passage is also effected by opening the release valve 21.

In the embodiment of FIG. 4, the stroke "P" is determined so as to be substantially equal to or slightly shorter than the stroke "L". Therefore, if the piston 32 moves its full stroke "P", the piston 32 will not abut against the hat sleeve 30 and thus the sleeve 30 is not moved upwardly by the piston 32 in a manner which would open the main passage.

Accordingly, if the oil is supplied toward the chamber A in advance of the resetting of the piston 32 and thereafter the handle 8 is manipulated to raise the piston 32 by raising the hat sleeve 30 through the rotation of the stem 3, during which operation the by-passing passage 38 is blocked, the sleeve 30 will not be moved upwardly by the upwardly moving piston 32 due to the blocking of the passage 38 because the sleeve 30 and the piston 32 are separated by the distance "L" at the time of the blocking of the passage 38.

Whilst in the embodiment of FIG. 4, the by-pass passage is provided in the inner surface of the hydraulic cylinder, such by-pass passage may be provided at another location to communicate the chambers A and B with each other when the hat sleeve is disposed in the lower position and a suitable valve is arranged to be closed when the hat sleeve is raised by a predetermined stroke. In the embodiment of FIG. 4, the application sequence of the hydraulic pressure is not critical with respect to the opening operation for the main passage. In other words, any inadvertent opening can be prevented.

In the embodiment of FIG. 4, the general configuration of the whole valve is almost similar to that shown in FIG. 1 wherein the valve stem is manipulated by a shaft which is in a substantially normal relation to the valve stem. Therefore, the mechanism for transmitting the torque from the manipulating handle to the valve stem is necessarily somewhat complex. Also the provision of the by-passing passage between the inner surface of the cylinder and the piston makes the fabrication process for such portion uneconomical.

Figure 5:
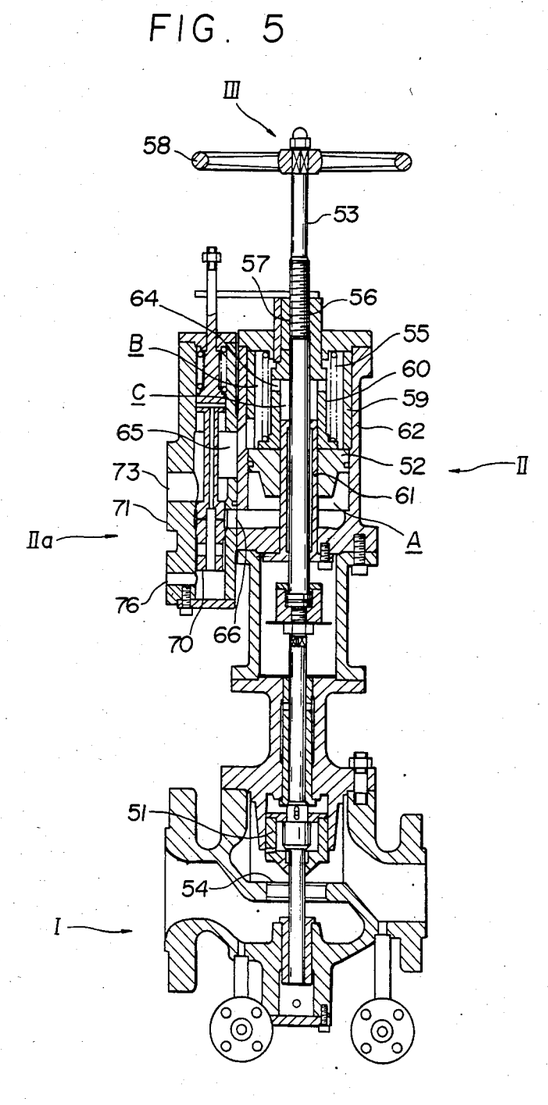
FIG. 5 is a cross sectional view of second embodiment according to the present invention.

In FIG. 5, another embodiment according to the present invention is shown.

The portions identified as I, II and III are the equivalent to those shown in FIG. 1 but the positional relationship is somewhat different and they are aligned on the same axis. In this embodiment, instead of the by-pass passage being integrally formed within the cylinder housing, a hydraulic pressure control portion IIa is separately provided as a pilot relay valve in parallel to the axial direction of a valve stem.

The closure portion I for the main passage in the second embodiment of FIG. 5 is illustrated at the lower part of the trip throttle valve and the manipulating portion III is disposed at the top of the T and T valve.

Figure 6:
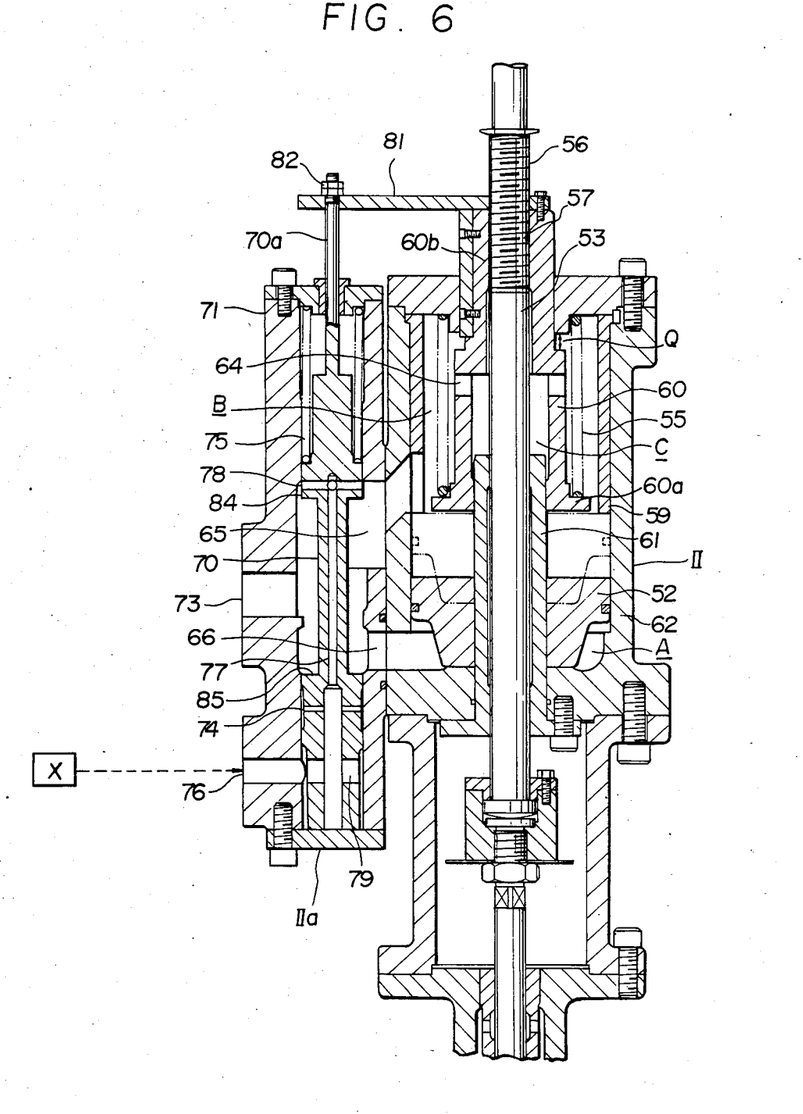
FIG. 6 is an enlarged view of the hydraulic portion shown in FIG. 5.

A valve stem 53 axially extends through and, at the top of the stem 53, a manipulating handle 58 is attached and, at the lower end, a valve body 51 is secured thereto. A valve seat 54 is disposed so as to oppose the valve body 51 to close the main passage when the valve body 51 is seated therein. The stem 53 is received in a sleeve 61 so as to be axially slidable, the sleeve 61 being housed within a hydraulic cylinder 62. A hydraulic piston 52 is positioned within the cylinder 62 through which the stem 53 and the sleeve 61 extend. The piston 52 defines oil chambers A and B at opposite sides of the piston 52 within the cylinder, the chamber A being the pressure application side and having an inlet opening 66. Within the chamber B, a hat sleeve 60 is provided so as to be axially slidable over the sleeve 61. The hat sleeve 60 is provided with a flange 60a and a sleeve portion 60b. The hat sleeve 60 is urged by a spring 55 at its flange 60a toward the piston 52 so that the piston 52 normally rests on the bottom of the cylinder when the oil pressure is not being applied to the piston in the chamber A. The hat sleeve is internally threaded at 57 at the sleeve portion 60b which threadingly engages with a male thread 56 provided on the valve stem 53. Therefore, when the hat sleeve 60 urges the piston 52 by the compression spring 55 to the bottom of the cylinder 62 upon loss of hydraulic pressure in chamber A the valve stem 53 is also moved downwardly through the sleeve 60 whereby the main passage is closed by engagement of the valve body 51 with the valve seat 54. A stopper 59 is disposed within the cylinder 62 so as to restrict upward movement of the piston 52 at a certain axial position when it is moved upwardly by the application of the hydraulic pressure in the chamber A. A space C is formed between a hat sleeve 60 and the sleeve 61 which is communicated with a discharge or outlet port 73 of the pilot relay valve portion IIa through a balancing hole 64 in the hat sleeve 60, the discharge side oil chamber B and a discharge passage 65. The pilot relay valve portion IIa is constructed so as to comprise a valve housing 71 having an axial bore in which a plunger 70 is slidably received so as to be axially movable. The housing 71 is provided with an inlet port 76 in addition to the outlet port 73. The housing 71 is also provided with an inlet opening 66 and a discharge passage 65 so as to communicate with chambers A and B, respectively. The plunger 70 is urged to the bottom by a spring 75 disposed within the bore of the housing when no hydraulic pressure is supplied from inlet port 76. This situation with said plunger corresponds to that shown in FIG. 6. Actually, FIG. 6 shows the situation where, after hydraulic pressure from inlet port 76 is lost and plunger 70 rests on the bore bottom of the housing 71, the hat sleeve 60 is reset, whereupon the coupling member 81 just touches the nut 82. The plunger 70 is provided with an axial hole 77 leading from the bottom end to an upper portion where a first transverse orifice 78 is perforated at a first land 84 of the plunger, the orifice 78 being in communication with the discharge passage 65 when the plunger 70 is in the position shown in FIG. 6. Also a transverse through hole 79 is perforated at the lower portion of the plunger which is communicated with the axial hole 77. Therefore, under this situation, if the hydraulic pressure is supplied into the housing 71 from the pressure source "X" through the inlet port 76 and the transverse hole 79, the oil passes the axial hole 77 to the first transverse orifice 78 and thence to the outlet port 73 through the discharge passage 65. Accordingly, there will be no movement of the plunger 70 even if the oil is supplied through the inlet port 76.

The plunger 70 is further provided with a second transverse orifice 74 at its second land 85 which is to be aligned with the inlet opening 66 of the hydraulic cylinder 62 when the plunger is moved up by coupling member 81 to block the first transverse orifice 78 and is consequently shifted to the position shown in FIG. 5 by hydraulic pressure applied through the inlet port 76. The second transverse orifice 74 is blocked for its communication with the inlet opening 66 or the discharge passage 65 by means of the second land on the outer surface of the plunger 70 at the side of the discharge passage 65 with respect to the second transverse orifice 74, when said plunger is shifted to the position in FIG. 6.

In order to effect the movement of the piston 52 and thence the opening of the main passage in the portion I, it is necessary to reset the pilot relay valve IIa. To such end, a slender extension shaft 70a is provided at the upper part of the plunger 70 so that said extension shaft 70a extends upwardly through the upper end of the valve housing 71. If this extension shaft 70a is pulled upwardly to move the plunger 70 against the bias of the spring 75, the first transverse orifice 78 becomes blocked by the first land and the housing 71 and the second transverse orifice 74 is coupled to the inlet opening 66 as shown in FIG. 5. Therefore, if the plunger 70 is maintained in this position and the hydraulic pressure is applied through the inlet port 76, the hydraulic pressure is applied to the chamber A through the axial hole 77 and the second transverse orifice 74 and urges the piston 52 upwardly. However, if this moment occurs before the hat sleeve 60 clears the bottom end of the stopper 59 and hat sleeve 60 is in a condition to be moved upwardly together with the upward movement of the piston 52, the valve body 51 is also moved upwardly to open the main passage irrespective of the operator's intension which may cause a critical or dangerous situation as explained in connection with the prior art valve shown in FIG. 1.

Therefore, means has been devised to interconnect the plunger 70 and the hat sleeve 60. At the upper end of the sleeve portion 60b of the hat sleeve 60 protruding out of the hydraulic cylinder 62, a coupling member 81 is attached so as to extend toward the extension shaft 70a. On the other hand, the extension shaft 70a loosely extends through a hole provided in the corresponding part of the coupling member 81. At the end of the extension shaft 70a, an engaging member or nut 82 is secured above the member 81 so that the upward movement of the member 81 will engage the nut 82 to pull the plunger 70 upwardly to make communication between the second transverse orifice 74 and the inlet opening 66 while the first transverse orifice 78 is blocked. Such upward movement of the member 81 is effected together with the upward movement of the hat sleeve 60 against the spring 55 through the engagement of the threads 56 and 57 when the handle 58 is rotated in the direction to close the main passage in the portion I. During upward movement of the hat sleeve 60, the spring 55 is compressed and the bottom surface clears the bottom end of the stopper 59 and, at this moment, there still remains a dimension "Q" for a further upward stroke of the hat sleeve 60. The position of the nut 82 at the end of the extension shaft 70a is arranged so that further upward movement of the hat sleeve 60 causes the coupling member 81 to engage the nut 82 so as to move the plunger 70 upwardly by which means the first transverse orifice 78 is blocked by the valve housing 71. Assuming that the hydraulic pressure has been applied beforehand to the inlet port 76 and the oil has been merely passing to the outlet port 73 through the transverse hole 79, axial hole 77 and the first transverse orifice 78, upon blocking of the first transverse orifice 78, the plunger 70 will be rapidly raised by the hydraulic pressure acting on the plunger through the inlet port 76 at the same time as overcoming the biasing force of the spring 75 and the plunger will take the position shown in FIG. 5. Then the hydraulic oil is fed into the chamber A through the second transverse orifice 74 and the inlet opening 66 thereby urging the piston 52 upwardly until it is arrested by the stopper 59, the plunger 70 being held in the position shown in FIG. 5 by the hydraulic pressure due to the relatively narrow passage of the second transverse orifice 74. The arrested position of the piston 52 is shown by a chain (imaginary) line in FIG. 6 and this situation is the condition in which the resetting of the T and T valve is complete. With this resetting condition, if the handle 58 is rotated in a direction to open the main passage, the hat sleeve 60 will be initially lowered by the thread engagement of the threads 56 and 57 until the sleeve 60 abuts against the arrested piston 52. The continued rotation of the handle 58 in the same direction will cause the valve stem 53 to move axially in the upward direction based on the hat sleeve 60 which is kept stationary by the piston 52 thereby gradually separating the valve body 51 from the valve seat 54 to open the main passage. In case of an emergency, a release valve upstream of the inlet port and having a relatively large passage is opened to quickly discharge the pressurized oil through the inlet port 76 whereby the spring 75 urges plunger 70 to the bottom of the housing 71, which causes the inlet opening 66 to communicate with the discharge passage 65 and the outlet port 73 through the passage which is large in size. Consequently the compressed spring 55 instantly extends to rapidly move the hat sleeve 60 together with the valve stem 53 and the valve body 51 to thus shut off the main passage.

As explained, during the supply of the hydraulic pressure before the resetting of the valve shown in FIGS. 5 and 6, there will be no inadvertent opening of the main passage because the plunger 70 will never be reset upwardly before the bottom of sleeve 60 clears the bottom of the stopper 59.

Figures 7, 8:
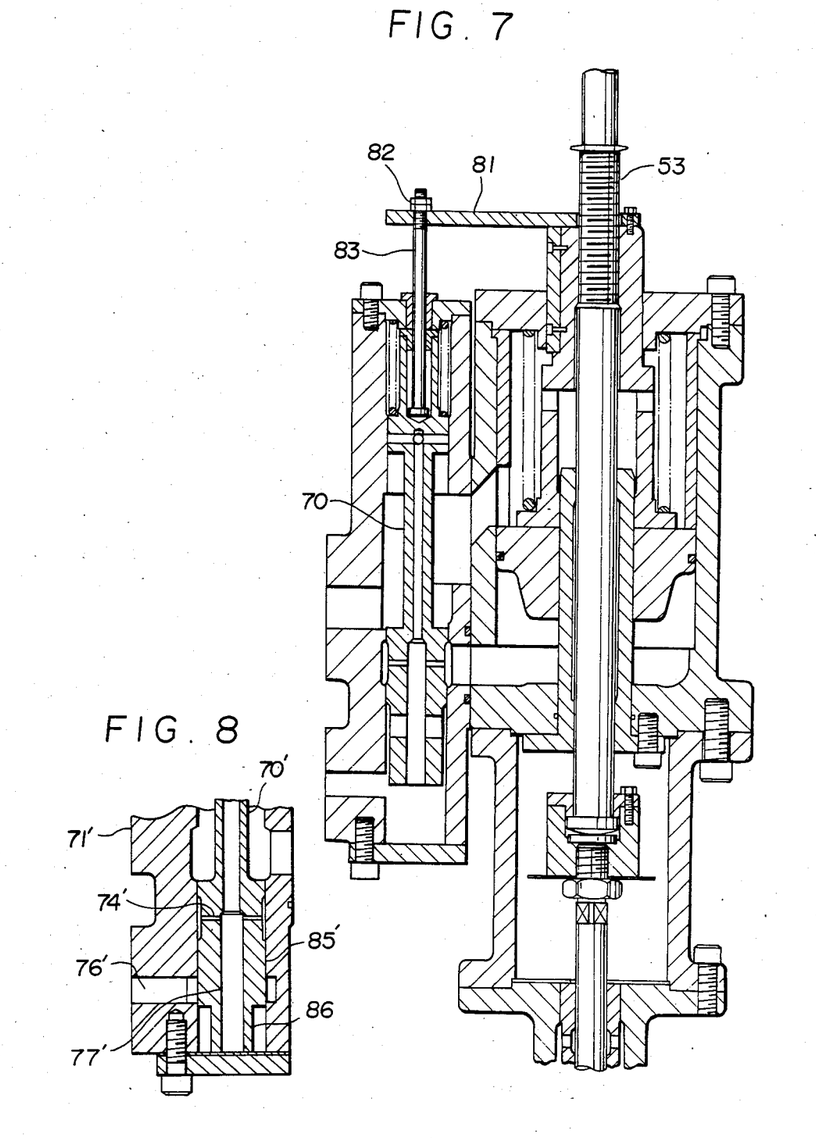
FIG. 7 shows a modified form of the portion shown in FIG. 6.
FIG. 8 is a further modification of the embodiment shown in FIGS. 5 and 6.

In the embodiment shown in FIGS. 5 and 6, there may be observed some risk that, when the first transverse orifice 78 is blocked, the plunger 70 may suddenly move upward thereby causing a critical situation by the sudden movement of the upper end of the extension shaft 70a. To prevent the possibility of such sudden movement of the extension shaft, a modified form is illustrated in FIG. 7 wherein the portion corresponding to the extension shaft 70a is made as a small extension shaft 83 which is independent from the plunger 70, allowing relative axial movement therebetween, and the extension shaft 83 is arranged to be slidably received in the upper part of the plunger 70, while upwardly movement of the extension shaft 83 by means of the coupling member 81 and the nut 82 will cause the upward movement of the plunger 70. By the provision of the available relative axial stroke between the extension shaft 83 and the plunger 70, the risk of sudden projection of the upper end of the extension shaft is avoided.

In the embodiment explained in connection with FIGS. 5, 6 and 7, the hydraulic liquid or oil is constantly supplied through the inlet port 76, transverse through hole 79, axial hole 77, first transverse orifice 78, discharge space 65 and the outlet port 73 and the amount of such flowing hydraulic oil which is merely passing through is substantial. Thus the discharge plumbing to be coupled to the outlet port must be given a sufficient size to allow such hydraulic liquid to flow smoothly. This situation, therefore, is somewhat uneconomical. This problem is solved by the modification illustrated in FIG. 8.

In FIG. 8, a transverse through hole corresponding to the through hole 79 in the plunger 70 in FIG. 6 is omitted in the plunger 70' in FIG. 8. The outer diameter of the cylindrical portion below a second land 85' is identified as 86 giving the clearance between the diameter 86 and the inner cylindrical surface of the valve housing 71'. (Whilst such clearance is also given in FIG. 6, the clearance is enlarged in FIG. 8.) In FIG. 8, the second land 85' is arranged to block the inlet port 76' when the plunger 70' is in the position shown in FIG. 8. Therefore, the hydraulic oil will not pass through the inside of the pilot relay valve housing 71' except for some amount which leaks between the plunger and the valve housing. Thus the relatively large discharge plumbing at the outlet port is not necessarily required. When the plunger 70' is raised for resetting, the amount of the hydraulic liquid is not large since the second transverse orifice 74' is relatively narrow, which fact limits the flow rate of oil fed into the chamber A.

In the foregoing explanation, the positional relationship of the portions, members or elements were explained by using terms such as upper, lower and/or bottom etc.; however, it should be noted that these terms are not intended to limit the positional relationship and the concerned positions may be opposite or in other locations or orientation, such as in the horizontal plane, provided that their functions are appropriately satisfied.

While the present invention has been explained in detail referring to the specific embodiments, it is not limited to those explained and it may be modified or changed by those skilled in the art within the scope and sprit of the present invention defined by the claims appended hereto.

What is claimed is:

1. A trip throttle valve operable under hydraulic pressure comprising:
   a main passage for passing fluid therethrough and having a valve body and a valve seat therein;
   a valve stem secured to said valve body at one end and arranged to close and open said main passage when said stem is moved in its axial direction;
   a hydraulic portion including a piston, a sleeve and a cylinder disposed around an end portion of said stem opposite said valve body, both said piston and said sleeve being movable along an axial direction of said stem, said stem, having a male thread around said end portion which is threadably engaged with said sleeve, which has a compatible female thread, so that the rotation of said stem will cause relative axial movements therebetween, a compression spring located in said cylinder wherein said sleeve together with stem are urged by said compression spring in a direction to close said main passage, a stopper positioned in said cylinder wherein said piston is urged towards said sleeve when hydraulic pressure is applied through an inlet port of said hydraulic portion, and is arrested at a terminal position within said cylinder by said stopper, said piston restricting movement of said sleeve when said sleeve abuts against said piston arrested at said terminal position under hydraulic pressure and thereafter allowing axial movement of said stem upon rotation of said stem;
   a by-passing passage for the hydraulic liquid to discharge said liquid supply through said inlet port outwardly from said outlet port of said hydraulic portion except in a case when said pistion is in said arrested terminal position, said inlet and said outlet port being arranged to discharge liquid from said hydraulic portion when the supply of the hydraulic liquid to said hydraulic portion is stopped so as to cause sudden movement of said sleeve under biasing of said compression spring so as to instantly close said main passage;
   closing means for closing said by-passing passage;
   manipulating means for rotating said valve stem, said piston being disconnected from said sleeve and said stem and wherein a movable stroke of said piston is not greater than a movable distance of said sleeve, so that axial movement of said stem by rotation thereof causes said sleeve to move axially so as to separate said sleeve from said piston and said axial movement of said stem is interrelated with said closing means so as to close said by-passing passage only after one axial end of said sleeve adjacent said piston clears said stopper whereby said piston is prevented from causing the movement of said sleeve while being arrested by said stopper.

2. A trip throttle valve as claimed in claim 1, wherein said hydraulic portion further comprises:
   a pilot relay valve including a valve housing provided with an axial bore, an inlet port and an outlet port, a plunger slidably received in said axial bore and provided with an axial hole opening at one end of the plunger and first and second transverse orifices each communicating with said axial bore, and a coil spring biasing said plunger in a first direction to establish communication between said inlet port and outlet port through said axial hole and said first transver orifice so as to establish said by-pass passage and also to establish communication between an outlet port and said inlet opening of said cylinder while blocking said second transverse orifice by said valve housing, said plunger being movable against said spring by being pulled in a second direction opposite said first direction to block said first transverse orifice by said valve housing, thus preventing communication of said outlet port with said inlet port of said valve housing and said inlet opening of said cylinder while allowing communication between said inlet port and said inlet opening of said cylinder while allowing communication between said inlet port and said inlet opening, which position of said plunger is maintained by application of hydraulic pressure through said inlet port so as to cause the movement of said piston until being arrested by said stopper.

3. A trip throttle valve as claimed in claim 1, further comprising means for interconnecting said sleeve and said plunger so that said plunger is pulled in a second direction after said sleeve is moved against said compression spring by the rotation of the valve stem until said piston becomes movable with respect to said stopper without contacting sail sleeve.

4. A trip throttle valve as claimed in claim 2 or 3 wherein a second end having a second transverse orifice is long enough to cover said inlet port when said plunger rests on the end of said valve housing in said first direction, so as to block hydraulic pressure from said inlet port to said valve housing.

* * * * *